(12) United States Patent
Pavell et al.

(10) Patent No.: US 11,428,531 B1
(45) Date of Patent: Aug. 30, 2022

(54) DIFFUSION BLOCK FOR AN EVACUATED INSTRUMENT SYSTEM

(71) Applicants: James M. Pavell, Thousand Oaks, CA (US); A. Douglas Meyer, Woodland Hills, CA (US)

(72) Inventors: James M. Pavell, Thousand Oaks, CA (US); A. Douglas Meyer, Woodland Hills, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 0 days.

(21) Appl. No.: 17/208,809

(22) Filed: Mar. 22, 2021

(51) Int. Cl.
*G01C 19/5783* (2012.01)

(52) U.S. Cl.
CPC ................ *G01C 19/5783* (2013.01)

(58) Field of Classification Search
CPC .................................. G01C 19/5783
See application file for complete search history.

(56) References Cited

U.S. PATENT DOCUMENTS

| 6,899,744 | B2 | 5/2005 | Mundschau |
| 7,012,328 | B2 | 3/2006 | Costello et al. |
| 7,222,532 | B2 * | 5/2007 | Choi ............... G01C 19/5691 73/431 |
| 2009/0031832 | A1 | 2/2009 | Choi et al. |

FOREIGN PATENT DOCUMENTS

EP 2779240 A2 9/2014

OTHER PUBLICATIONS

Kajama, et al.: "Single Gas Permeation on ?-Alumina Ceramic Support"; Journal of Advanced Chemical Engineering; vol. 6, Issue 2, 2016, ISSN: 2090-4568 ACE an open access journal; DOI: 10.4172/2090-4568.1000154; pp. 1-4.

Meyer, et al.: "milli-HRG Inertial Sensor Assembly—a Reality"; 2018 IEEE/ION Position, Location and Navigation Symposium (PLANS); Conference Apr. 23-26, 2018; ISSN: 2153-3598; DOI: 10.1109/PLANS.2018.8373359; pp. 20-23.

Norton: "Helium Diffusion Through Glass"; Journal of the American Ceramic Society; Presented at the Fall Meeting of the Glass Division, The American Ceramic Society, Corning, N. Y., Oct. 12, 1951; Published Mar. 1953; https://doi.org/10.1111/j.1151-2916.1953.tb12843.x; pp. 90-96.

(Continued)

*Primary Examiner* — Walter L Lindsay, Jr.
*Assistant Examiner* — Andrew V Do
(74) *Attorney, Agent, or Firm* — Tarolli, Sundheim, Covell & Tummino LLP

(57) ABSTRACT

One example includes an instrument system. The system includes instrument components at least partially disposed in an evacuated chamber within an instrument housing. The system also includes a barrier that is configured to seal the evacuated chamber. The barrier includes a plurality of instrument electrodes that are electrically coupled to the instrument components and extending through the barrier. The system further includes a diffusion block formed of a non-diffusive material and coupled to the instrument housing to seal an evacuated cavity within the instrument housing between the barrier and the diffusion block.

21 Claims, 5 Drawing Sheets

(56) References Cited

OTHER PUBLICATIONS

Prikhodko, et al.: "North-Finding With 0.004 Radian Precision Using a Silicon MEMS Quadruple Mass Gyroscope With Q-Factor of 1 Million"; 2012 IEEE 25th International Conference on Micro Electro Mechanical Systems (MEMS); Conference Jan. 29-Feb. 2, 2012; Added to IEEE Xplore: Mar. 15, 2012; ISSN: 1084-6999; DOI: 10.1109/MEMSYS.2012.6170119.

Shea: "Reliability of MEMS for space applications"; Reliability, Packaging, Testing, and Characterization of MEMS/MOEMS V, edited by Danelle M. Tanner, Rajeshuni Ramesham, Proc. of SPIE vol. 6111, 61110A, (2006) • 0277-786X/06/$15 • doi: 10.1117/12.651008; Proc. of SPIE vol. 6111 61110A-1 through 10.

\* cited by examiner

DIFFUSION BLOCK FOR AN EVACUATED INSTRUMENT SYSTEM

TECHNICAL FIELD

This disclosure relates generally to electronic systems, and more specifically to a diffusion block for an evacuated instrument system.

BACKGROUND

Some instruments, such as inertial sensors, includes components that operate in a vacuum. Such instruments require a tight seal to ensure that atmospheric gasses do not diffuse into the evacuated volume within. As an example, atmospheric gasses that diffuse into the evacuated volume of the instrument can result in a compromised performance of the instrument. For example, an oscillator or resonator that operates based on vibratory motion in a vacuum can experience resistance and motion damping from gases that diffuse into the evacuated volume. Thus, the diffusion of gasses into the evacuated volume can degrade the performance and shorten the useful lifetime of the instrument due to gas build up in the interior volume and the corresponding reduction in the vacuum of the interior volume. While environmental sealing the instrument can provide protection against the diffusion of most types of gasses into the evacuated volume. However, some materials can allow the diffusion of certain gases into the evacuated volume. For example helium has a partial pressure of 5 ppm at standard atmospheric pressure, which can still result in diffusion into an evacuated volume, such as through exposed glass feedthroughs, penetrations, and surfaces.

SUMMARY

One example includes an instrument system. The system includes instrument components at least partially disposed in an evacuated chamber within an instrument housing. The system also includes a barrier configured to seal the evacuated chamber. The barrier includes a plurality of instrument electrodes that are electrically coupled to the instrument components and extending through the barrier. The system further includes a diffusion block formed of a non-diffusive material and coupled to the instrument housing to seal an evacuated cavity within the instrument housing between the barrier and the diffusion block.

Another example includes a method for forming an instrument system. The method includes disposing instrument components in a chamber through an annular opening of an instrument housing. The method also includes evacuating the chamber and sealing the evacuated chamber with a barrier. The barrier includes instrument electrodes that are electrically coupled to the instrument components and extend through the barrier. The method also includes evacuating a cavity formed between the annular opening of the instrument housing and the barrier. The method further includes inserting a diffusion block into the annular opening of the instrument housing to seal the evacuated cavity. The diffusion block includes a plurality of through-electrodes that extend through the diffusion block and which are electrically coupled to the respective plurality of instrument electrodes.

Another example includes an inertial sensor system. The system also includes a resonator at least partially disposed in an evacuated chamber within an instrument housing. The system also includes a barrier that is configured to seal the evacuated chamber. The barrier includes a plurality of instrument electrodes that are electrically coupled to the instrument components and extending through the barrier. The system further includes a diffusion block formed of a non-diffusive material and coupled to the instrument housing to seal an evacuated cavity within the instrument housing between the barrier and the diffusion block. The diffusion block includes a plurality of through-electrodes that extend through the diffusion block and which are electrically coupled to the respective plurality of instrument electrodes.

DETAILED DESCRIPTION

This disclosure relates generally to electronic systems, and more specifically to a diffusion block for an evacuated instrument system. As an example, the instrument can correspond to an inertial sensor, such as including a resonator that is subject to periodic electrostatic motion. The instrument can include an instrument housing that includes an evacuated chamber in which instrument components, such as the resonator, are disposed. The evacuated chamber can be sealed by a barrier, such as formed from glass, through which instrument electrodes extend that are electrically coupled to the instrument components. As described herein, the term "electrically coupled" with respect to the instrument electrodes and the instrument components can be any of a variety of electrical coupling, such as via direct conductive coupling, inductive coupling, or electrostatic coupling. For example, the instrument electrodes can conduct forcer signals that provide electrostatic force onto an associated resonator of the instrument, and can conduct capacitive pickoff signals.

The instrument also includes a diffusion block that can be coupled to an annular opening of the instrument housing to seal an evacuated cavity within the instrument housing between the barrier and the diffusion block. For example, the diffusion block can be formed of a non-diffusive material, such as ceramic, and can include through-electrodes that are formed therein and extend therethrough. Each of the through-electrodes can be electrically coupled to the instrument electrodes in the barrier. For example, the instrument can include flexible conductors that extend from the through-electrodes to the instrument electrodes in the barrier through the evacuated cavity to provide electrical contact from the instrument electrodes in the barrier to an exterior of the instrument. As an example, the diffusion block can be coupled to the instrument housing via a metal-to-metal seal, such as based on any of a variety of metal-to-metal sealing techniques. For example, the diffusion block can be coupled to the instrument housing via eutectic sealing (e.g., soldering), base metal fusing (e.g., welding), or other sealing techniques. As an example, the diffusion block can be soldered to the instrument housing based on a solder preform provided along a periphery of the diffusion block and melted into a groove along an interior surface of an annular opening, thereby sealing the evacuated cavity (e.g., inside a vacuum furnace). Therefore, based on including an evacuated cavity on the other side of the barrier that seals the evacuated instrument chamber, the instrument can have significant reduction of diffusion of gasses (e.g., helium) into the evacuated instrument chamber that can negatively impact operation of the instrument.

Figure 1:
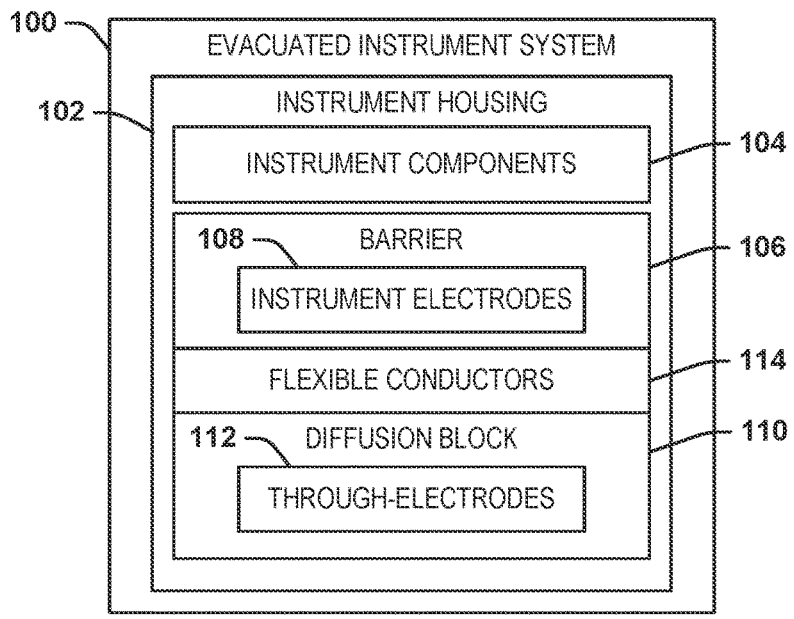
FIG. 1 illustrates an example of a block diagram of an instrument system.

FIG. 1 illustrates an example of a block diagram of an evacuated instrument system 100. As an example, the instrument can correspond to an inertial sensor, such as including a resonator that is subject to periodic electrostatic motion. For example, the evacuated instrument system 100 can correspond to a Coriolis Vibratory Gyroscope (CVG) (e.g., a Hemispherical Resonator Gyroscope (HRG) or a milli-Hemispherical Resonator Gyro (mHRG)). The instrument system 100 can include an instrument housing 102 that accommodates instrument components 104. For example, the instrument housing 102 can be formed from any of a variety of non-diffusive materials with respect to atmospheric gasses (e.g., helium). As an example, the instrument components 104 can include a resonator that is configured to resonate during normal operation of the instrument system. The instrument components 104 can thus be disposed within an evacuated chamber in the instrument housing 102. For example, the chamber can be evacuated to ensure that the instrument components 104 (e.g., the resonator(s)) are substantially unimpeded by resistance caused by the presence of atmospheric gasses.

The evacuated chamber in which the instrument components 104 are disposed can be sealed by a barrier 106. As an example, the barrier 106 can be formed from any of a variety of glass materials. In the example of FIG. 1, the barrier 106 can include instrument electrodes 108 that extend through the barrier 106 and which are electrically coupled to the instrument components 104. In the example of the instrument system 100 being configured as an inertial sensor with instrument components 104 that include a resonator, the instrument electrodes 108 can conduct forcer signals that provide electrostatic force to provide periodic motion of the resonator, and/or can conduct capacitive pickoff signals to detect the periodic motion of the resonator.

In the example of FIG. 1, the instrument system 100 further includes a diffusion block 110. The diffusion block 110 can be coupled to an annular opening of the instrument housing 102 to form an evacuated cavity within the instrument housing 102 between the barrier 106 and the diffusion block 110. For example, the diffusion block 110 can be formed of a non-diffusive material, such as ceramic, and includes through-electrodes 112 that are formed therein and extend therethrough. Each of the through-electrodes 112 can be electrically coupled to the instrument electrodes 108 in the barrier 106 via flexible conductors 114 that extend from the through-electrodes 112 to the instrument electrodes 108 in the barrier 106 through the evacuated cavity. For example, the flexible conductors 114 can be configured as Fuzz Buttons™. Therefore, the flexible conductors 114 provide electrical contact from the instrument electrodes 108 in the barrier 106 to an exterior of the instrument system 100. As an example, the diffusion block 110 can be bonded to the instrument housing 102, such as based on a metal-to-metal sealing method along a periphery of the diffusion block 110, thereby sealing the evacuated cavity (e.g., inside a vacuum furnace).

Given that the only region in which a gas can diffuse into the instrument housing 102, and thus into the evacuated chamber that includes the instrument components 104, is through the annular opening, the instrument system 100 mitigates gas diffusion into the evacuated chamber based on the interposing evacuated cavity formed by the diffusion block 110. Therefore, based on forming the evacuated cavity between the exterior of the instrument system 100 and the barrier 106 that seals the evacuated chamber that includes the instrument components 104, the instrument system 100 can significantly mitigate the diffusion of gasses (e.g., helium) into the evacuated chamber that includes the instrument components 104. Because the instrument components 104 can be required to operate in a vacuum, or can move (e.g., resonate), the presence of atmospheric gasses can deleteriously affect operation of the instrument components 104, such as based on providing resistance to motion (e.g., periodic resonation). Accordingly, by mitigating the diffusion of gasses into the evacuated chamber that includes the instrument components 104, the instrument system 100 can operate more accurately and with a longer operational lifetime.

Figure 2:
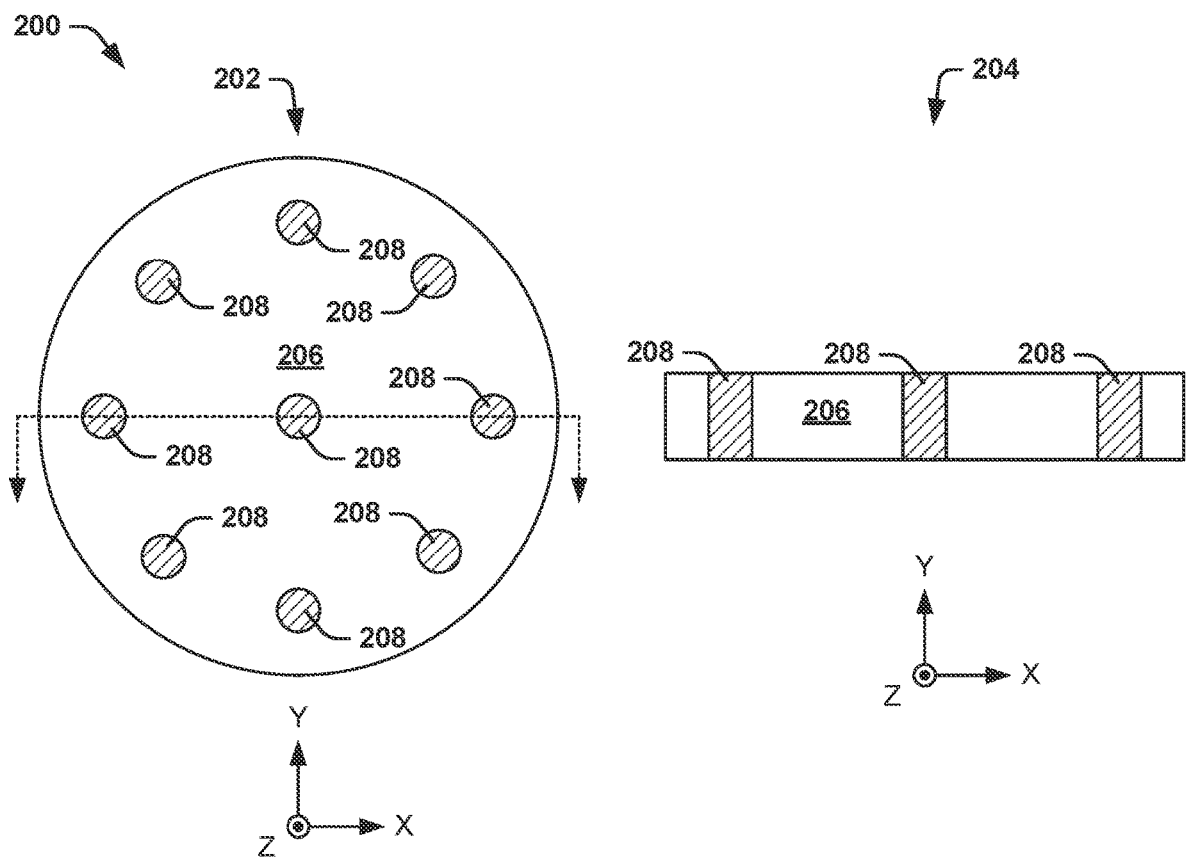
FIG. 2 illustrates an example diagram of a diffusion block.

FIG. 2 illustrates an example diagram 200 of a diffusion block. The diffusion block 200 is demonstrated in the example of FIG. 2 in a first view 202 and a second view 204 that are orthogonal based on the Cartesian coordinate system. In the example of FIG. 2, the second view 204 corresponds to a cross-sectional view along "A". The diffusion block in the example diagram 200 can correspond to the diffusion block 110 in the example of FIG. 1. Therefore, reference is to be made to the example of FIG. 1 in the following description of the example of FIG. 2.

The diffusion block includes a body material portion 206 and a plurality of through-electrodes 208. For example, the body material portion 206 can be formed of a non-diffusive material, such as ceramic. The through-electrodes 208 can be formed in the body material portion 206 to extend through the entire thickness of the body material portion 206 to be exposed on both opposing sides of the diffusion block. The through-electrodes 208 can be formed of any of a variety of conductive materials to provide conductive coupling through the diffusion block. Therefore, as described in greater detail herein, external electronics (e.g., signal generators, processors, etc.) can be electrically coupled to the through-electrodes 612 at the external facing surface of the diffusion block 604 to interact with the instrument components therein.

Figure 3:
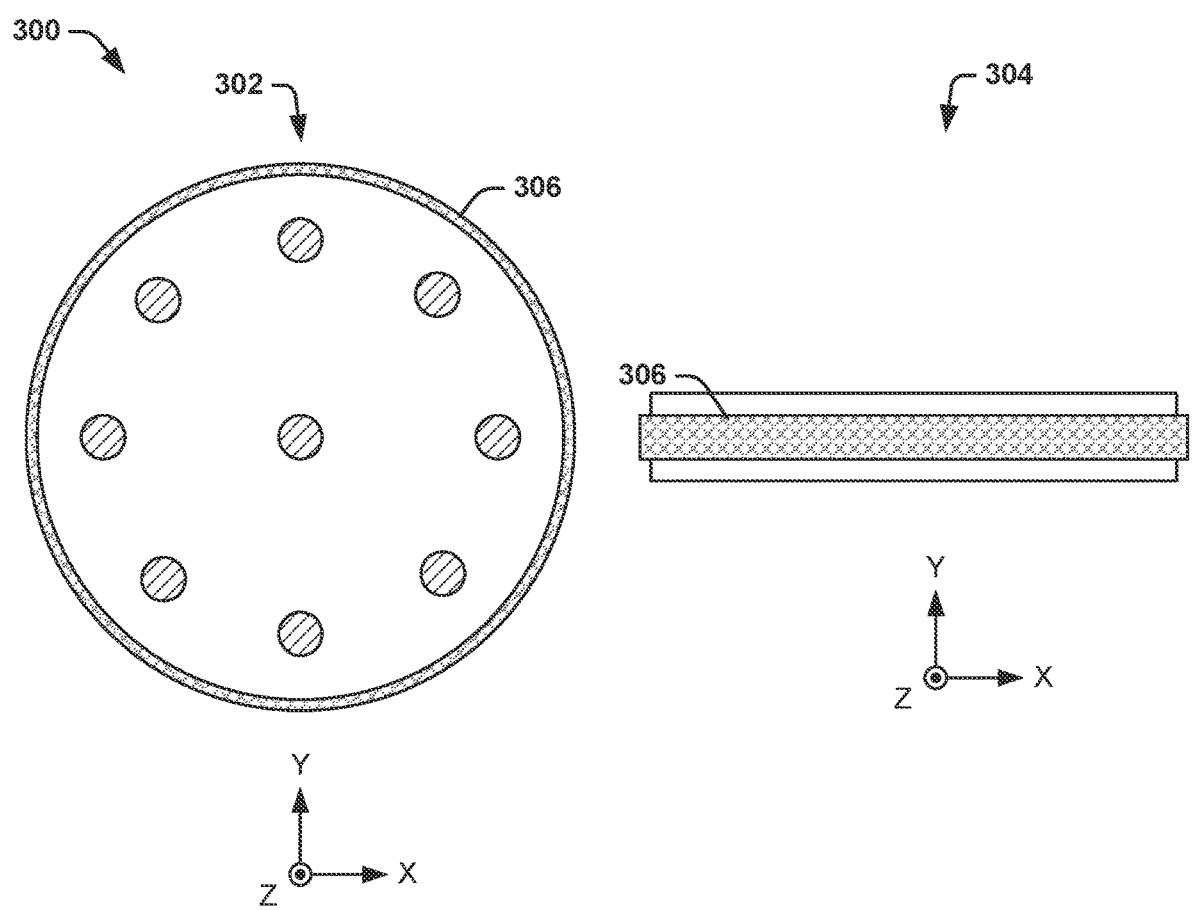
FIG. 3 illustrates another example diagram of a diffusion block.

FIG. 3 illustrates an example diagram 300 of the diffusion block. The diffusion block is demonstrated in the example of FIG. 3 in the first view 302 and the second view 304 that are orthogonal based on the Cartesian coordinate system. The diffusion block in the example diagram 300 can correspond to the diffusion block 110 in the example of FIG. 1. Therefore, reference is to be made to the example of FIGS. 1 and 2 in the following description of the example of FIG. 3.

As an example, the diffusion block can be soldered to the instrument housing 102. In the example of FIG. 3, the diffusion block includes a solder preform 306 provided along a periphery of the diffusion block. The solder preform 306 can be formed of any of solder materials, such as indium, and can be formed along the periphery at a desired thickness/volume to provide an adequate seal of the diffusion block to the instrument housing 106. For example, the diffusion block can be slip-fit into the annular opening of the instrument housing 106 in a vacuum furnace. Thus, the solder preform 306 can be allowed to reflow into a groove along an interior surface of the annular opening, thereby sealing the evacuated cavity. While the example of FIG. 3 and hereinafter demonstrates a solder sealing technique, other ways or providing a seal of the diffusion block to the instrument housing are possible.

Figure 4:
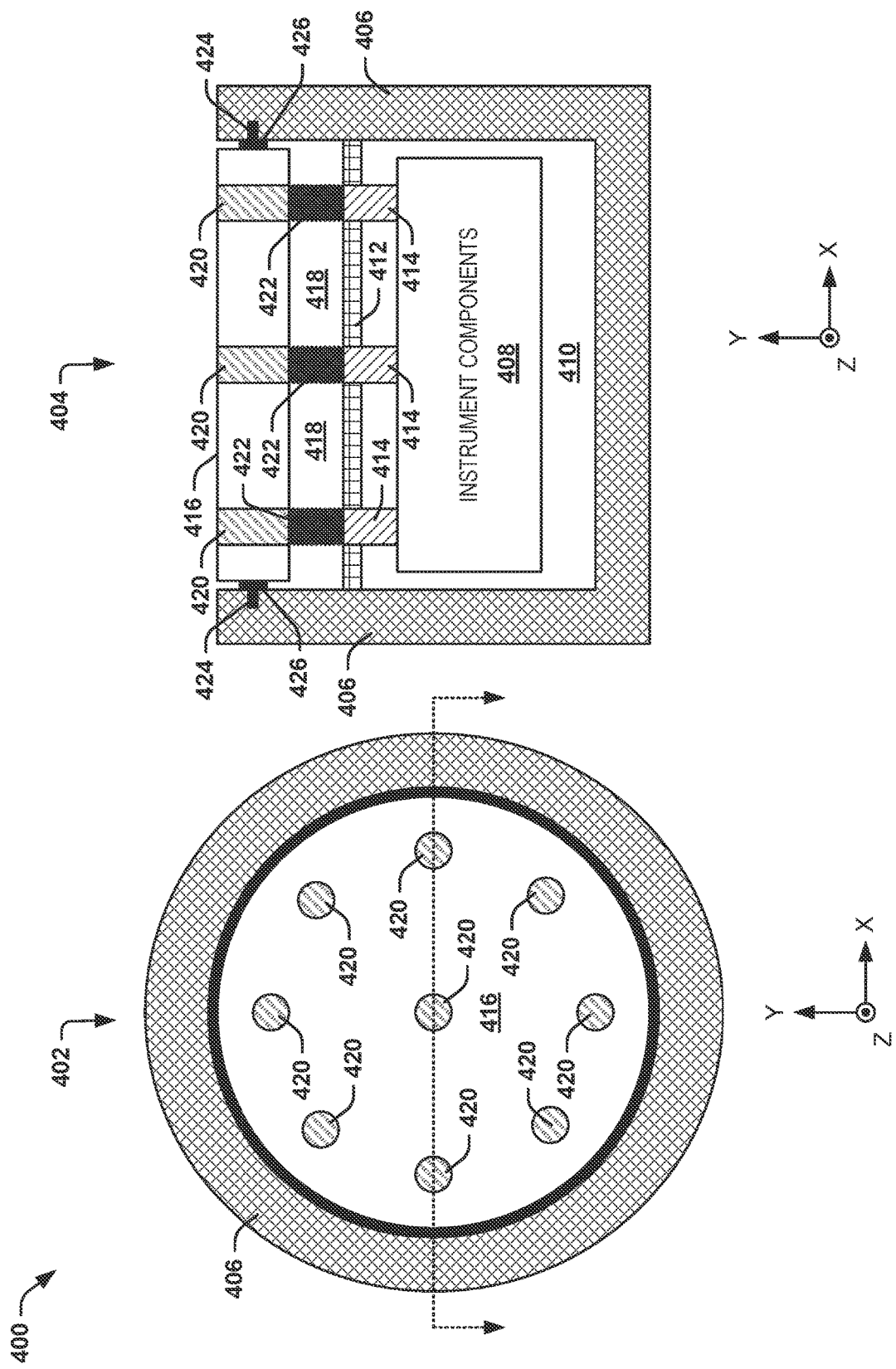
FIG. 4 illustrates an example diagram of an instrument system.

FIG. 4 illustrates an example diagram 400 of an instrument system. The instrument system is demonstrated in the example of FIG. 4 in the first view 402 and the second view 404 that are orthogonal based on the Cartesian coordinate system. In the example of FIG. 4, the second view 404 corresponds to a cross-sectional view along "A". The instrument system in the example diagram 400 can correspond to the instrument system 100 in the example of FIG. 1. Therefore, reference is to be made to the example of FIGS. 1-3 in the following description of the example of FIG. 4.

The instrument system includes an instrument housing 406 that accommodates instrument components 408. In the example of FIG. 4, the instrument components 408 are disposed in an evacuated chamber 410 that is bounded by the instrument housing 406 and a barrier 412. As described above, the evacuated chamber 410 can be evacuated to ensure that the instrument components 408 (e.g., the resonator(s)) are substantially unimpeded by resistance caused by the presence of atmospheric gasses. Therefore, the barrier 412 can seal the evacuated chamber 410. The barrier 412 includes instrument electrodes 414 that extend through the barrier 412 and which are electrically coupled to the instrument components 408.

In the example of FIG. 4, the instrument system further includes a diffusion block 416. The diffusion block 416 can be coupled to an annular opening of the instrument housing 406 to form an evacuated cavity 418 within the instrument housing 406 between the barrier 412 and the diffusion block 416. For example, the diffusion block 416 can be formed of a non-diffusive material, such as ceramic, and includes through-electrodes 420 that are formed therein and extend therethrough. Each of the through-electrodes 420 can be electrically coupled to the instrument electrodes 414 in the barrier 412 via flexible conductors 422 that extend from the through-electrodes 420 to the instrument electrodes 414 in the barrier 412 through the evacuated cavity 418. For example, the flexible conductors 422 can be configured as Fuzz Buttons™. Therefore, the flexible conductors 422 provide electrical contact from the instrument electrodes 414 in the barrier 412 to an exterior of the instrument system.

In the example of FIG. 4, the instrument housing 406 includes a groove 424 on an interior surface of the annular opening. Thus, upon the diffusion block 416 being slip-fit into the annular opening, such as in a vacuum furnace, solder material 426, such as corresponding to the solder preform 306, can reflow into the groove 424. Therefore, the soldered diffusion block 416 can seal the evacuated cavity 418. Accordingly, as described above, the arrangement of the evacuated cavity 418 being interposed between the evacuated chamber 410 and the exterior of the instrument system can mitigate the diffusion of gasses into the evacuated chamber 410. As a result, the instrument components 408 can maintain operation in a vacuum to provide for a longer operational lifetime of the instrument system.

Figure 5:
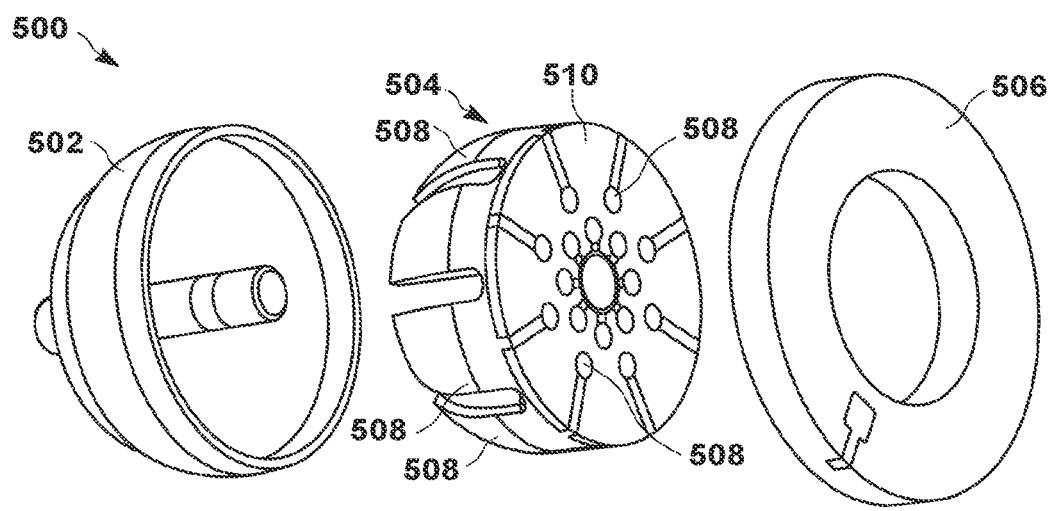
FIG. 5 illustrates a plan view of an instrument system.
Figure 6:
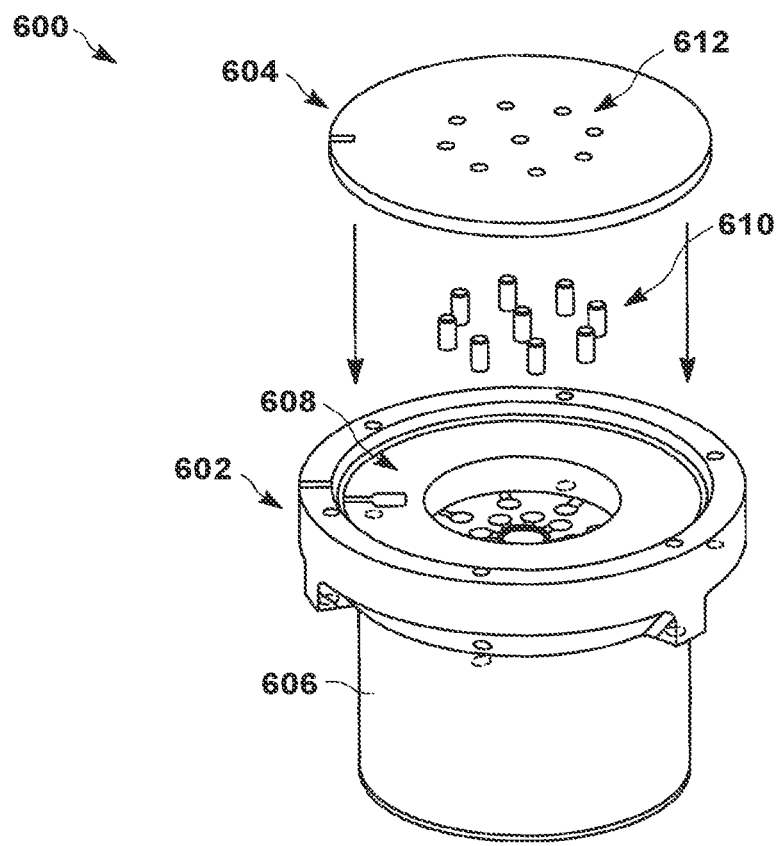
FIG. 6 illustrates another plan view of an instrument system.

FIGS. 5 and 6 each illustrate a plan view of an instrument system 500 and 600, respectively. As an example, the instrument system 500 can correspond to the instrument system 100 in the example of FIG. 1. Therefore, reference is to be made to the example of FIGS. 5 and 6. The instrument systems 500 and 600 are demonstrated by example as a Hemispherical Resonator Gyroscope (HRG, e.g., a milli-Hemispherical Resonator Gyroscope (mHRG)). While the instrument systems 500 and 600 are described herein as an HRG, it is to be understood that other types of instrument systems can include the diffusion block described herein to mitigate diffusion of gasses into an evacuated chamber therein, such as other types of CVGs.

The instrument system 500 is demonstrated in an exploded view that includes a resonator 502, an inner electrode assembly (IEA) 504, and a pickoff flange 506. The resonator 502 can be configured, for example, as a gold-plated resonator formed from a glass material. The resonator 502 is configured to substantially surround the IEA 504. The IEA 504 includes instrument electrodes 508 that extend through a frame 510 and which are contoured to provide capacitive coupling to an interior of the resonator 502. As an example, the barrier 510 can be formed of glass. Therefore, forcer signals can be provided onto the instrument electrodes 508 to provide electrostatic force to the resonator 502 to provide periodic motion of the resonator 502. Similarly, the instrument electrodes 508 can provide capacitive pickoff signals that are indicative of the periodic motion of the resonator 502.

The pickoff flange 506 can fit over the IEA 504 to provide a seal of the IEA to within an instrument housing, as explained herein. Therefore, the resonator 502, the IEA 504, and the pickoff flange 506 can collectively constitute sensor components. As an example, the pickoff flange 506 can be formed from glass. As described in the examples of FIGS. 5 and 6, the frame 510 and the pickoff flange 506 can correspond to the barrier described herein, such as sealing the resonator 502 in an evacuated chamber. The glass composition of the frame 510 and the pickoff flange 506 can provide for desirable performance characteristics of the instrument system 500. However, glass can be diffusive of atmospheric gasses, such as helium, which can thus render the barrier formed by the frame 510 and the pickoff flange 506 to be diffusive of atmospheric gasses.

Referring to the example of FIG. 6, the instrument system 600 is demonstrated in an exploded view that includes a sensor portion 602 and the diffusion block 604. The sensor portion 602 includes the instrument housing 606, in which the sensor components in the example of FIG. 5 are disposed. For example, the sensor components of the instrument system 600 include the resonator 502, the IEA 504, and the pickoff flange 506 disposed within the instrument housing 606. The sensor components can be provided in an annular opening, demonstrated at 608, of the instrument housing 606. Therefore, as described herein, the barrier formed by the frame 510 and the pickoff flange 506 can seal the resonator 502 in an evacuated chamber within the instrument housing 606.

The exploded view of the instrument system 600 also includes the flexible conductors 610 that are disposed within the annular opening 608 to make electrical contact with the instrument electrodes 508. Thereafter, to mitigate diffusion of atmospheric gasses into the evacuated chamber that includes the resonator 502, the diffusion block 604 can be mounted to the instrument housing 606. For example, the diffusion block 604 can be coupled to provide contact with an interior surface of the annular opening 608, such as in a vacuum furnace. As an example, the diffusion block 604 can be sealed to the interior surface of the annular opening 608 via solder (e.g., indium solder), such as based on a reflow of the melted solder into a groove that circumscribes the annular opening 608 on the interior surface of the annular opening 608. Therefore, the diffusion block 604 can seal an evacuated cavity that is bounded by the barrier, the instrument housing 606, and the diffusion block 604.

Additionally, in the example of FIG. 6, the diffusion block 604 includes through-electrodes 612 that extend through the diffusion block 604. Therefore, the through-electrodes 612 include exposed surfaces on opposite sides of the diffusion block 604. When the diffusion block 604 is provided in the annular opening 608 to form and seal the evacuated cavity, the through-electrodes 612 can contact the flexible conductors 610. Therefore, the through-electrodes 612 can be electrically coupled to the instrument electrodes 508 through the flexible conductors 610, and can therefore be electrically coupled to the instrument components through the flexible conductors 610 and the instrument electrodes 508. Accordingly, external electronics (e.g., signal generators, processors, etc.) can be electrically coupled to the through-electrodes 612 at the external facing surface of the diffusion block 604 to interact with the resonator 502 through the instrument electrodes 508.

Figure 7:
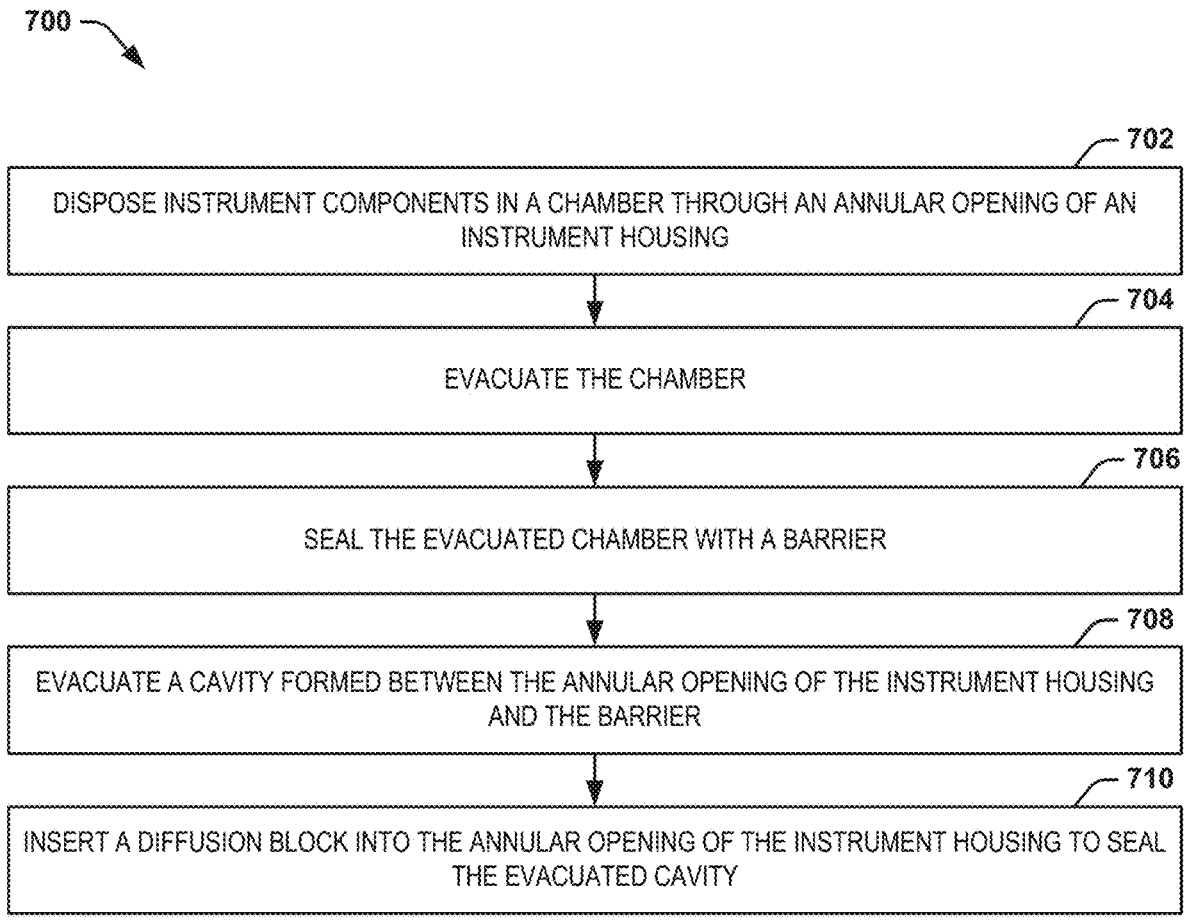
FIG. 7 illustrates an example of a method for fabricating an instrument system.

In view of the foregoing structural and functional features described above, methods in accordance with various aspects of the present disclosure will be better appreciated with reference to FIG. 7. While, for purposes of simplicity of explanation, the method of FIG. 7 is shown and described as executing serially, it is to be understood and appreciated that the present disclosure is not limited by the illustrated orders, as some aspects could, in accordance with the present disclosure, occur in different orders and/or concurrently with other aspects from that shown and described herein. Moreover, not all illustrated features may be required to implement method in accordance with an aspect of the present disclosure.

FIG. 7 illustrates a method 700 for forming an instrument system (e.g., the instrument system 100). At 702, instrument components (e.g., the instrument components 104) are disposed in a chamber through an annular opening (e.g., the annular opening 608) of an instrument housing (e.g., the instrument housing 102). At 704, the chamber (e.g., the evacuated chamber 410) is evacuated and sealed with a barrier (e.g., the barrier 106). The barrier includes instrument electrodes (e.g., the instrument electrodes 108) that are electrically coupled to the instrument components and extend through the barrier. At 706, a cavity (e.g., the evacuated cavity 418) formed between the annular opening of the instrument housing and the barrier is evacuated. At 708, a diffusion block is inserted into the annular opening of the instrument housing to seal the evacuated cavity. The diffusion block includes a plurality of through-electrodes (e.g., the through-electrodes 112) that extend through the diffusion block and which are electrically coupled to the respective plurality of instrument electrodes.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. An instrument system comprising:
   instrument components at least partially disposed in an evacuated chamber within an instrument housing;
   a barrier that is configured to seal the evacuated chamber, the barrier comprising a plurality of instrument electrodes that are electrically coupled to the instrument components and extending through the barrier; and
   a diffusion block formed of a non-diffusive material and coupled to the instrument housing to seal an evacuated cavity within the instrument housing between the barrier and the diffusion block.

2. The system of claim 1, wherein the diffusion block comprises a plurality of through-electrodes that extend through the diffusion block and which are electrically coupled to the respective plurality of instrument electrodes.

3. The system of claim 2, wherein the plurality of through-electrodes are electrically coupled to the respective plurality of instrument electrodes through flexible conductors that extend through the evacuated cavity.

4. The system of claim 3, wherein the plurality of flexible conductors are adapted to provide electrical contact from the instrument electrodes in the barrier to an exterior of the instrument system.

5. The system of claim 1, wherein the diffusion block is formed of a ceramic material.

6. The system of claim 1, wherein the diffusion block is inserted to make contact with the annular mounting surface to seal the evacuated cavity via a metal-to-metal sealing technique.

7. The system of claim 6, wherein the instrument housing comprises a groove in an interior annular mounting surface that surrounds the barrier, wherein a solder preform is circumscribed around the diffusion block, such that the diffusion block is inserted into the instrument housing to make contact with the interior annular mounting surface in a vacuum furnace to melt the solder preform into the groove.

8. The system of claim 7, wherein the solder is formed of indium.

9. The system of claim 1, wherein the instrument system is configured as an inertial sensor system, wherein the instrument components comprise a resonator.

10. The system of claim 9, wherein the inertial sensor system is configured as a Coriolis vibratory gyroscope (CVG) system.

11. The system of claim 1, wherein the barrier and the diffusion block are coupled to the instrument housing, the evacuated chamber being disposed between the barrier and the instrument housing and the evacuated cavity being disposed between the diffusion block and the barrier.

12. A method for forming an instrument system, the method comprising:
   disposing instrument components in a chamber through an annular opening of an instrument housing;
   evacuating the chamber;
   sealing the evacuated chamber with a barrier, the barrier comprising a plurality of instrument electrodes that are electrically coupled to the instrument components and extend through the barrier;
   evacuating a cavity formed between the annular opening of the instrument housing and the barrier; and
   inserting a diffusion block into the annular opening of the instrument housing to seal the evacuated cavity, the diffusion block comprising a plurality of through-electrodes that extend through the diffusion block and which are electrically coupled to the respective plurality of instrument electrodes.

13. The method of claim 12, further comprising inserting a plurality of flexible conductors into the annular opening to be electrically coupled to the respective plurality of instrument electrodes, wherein inserting the diffusion block comprises electrically coupling the plurality of through-electrodes to the respective plurality of flexible conductors.

14. The method of claim 12, further comprising sealing the diffusion block to the instrument housing to via a metal-to-metal sealing technique.

15. The method of claim 14, wherein sealing the diffusion block comprises:
circumscribing a solder preform around the diffusion block; and
melting the solder preform into a groove in an interior annular mounting surface that surrounds the barrier.

16. An inertial sensor system comprising:
a resonator at least partially disposed in an evacuated chamber within an instrument housing;
a barrier that is configured to seal the evacuated chamber, the barrier comprising a plurality of instrument electrodes that are electrically coupled to the instrument components and extending through the barrier; and
a diffusion block formed of a non-diffusive material and coupled to the instrument housing to seal an evacuated cavity within the instrument housing between the barrier and the diffusion block, the diffusion block comprising a plurality of through-electrodes that extend through the diffusion block and which are electrically coupled to the respective plurality of instrument electrodes.

17. The system of claim 16, wherein the plurality of through-electrodes are electrically coupled to the respective plurality of instrument electrodes through flexible conductors that extend through the evacuated cavity.

18. The system of claim 17, wherein the plurality of flexible conductors are adapted to provide electrical contact from the instrument electrodes in the barrier to an exterior of the instrument system.

19. The system of claim 16, wherein the diffusion block is formed of a ceramic material.

20. The system of claim 16, wherein the diffusion block is inserted to make contact with the annular mounting surface to seal the evacuated cavity via a metal-to-metal sealing technique.

21. The system of claim 20, wherein the instrument housing comprises a groove in an interior annular mounting surface that surrounds the barrier, wherein an indium solder preform is circumscribed around the diffusion block, such that the diffusion block is inserted into the instrument housing to make contact with the interior annular mounting surface in a vacuum furnace to melt the indium solder preform into the groove.

* * * * *